July 21, 1936.   R. APPELL   2,048,315
COOPER'S CROZE
Filed Feb. 11, 1935
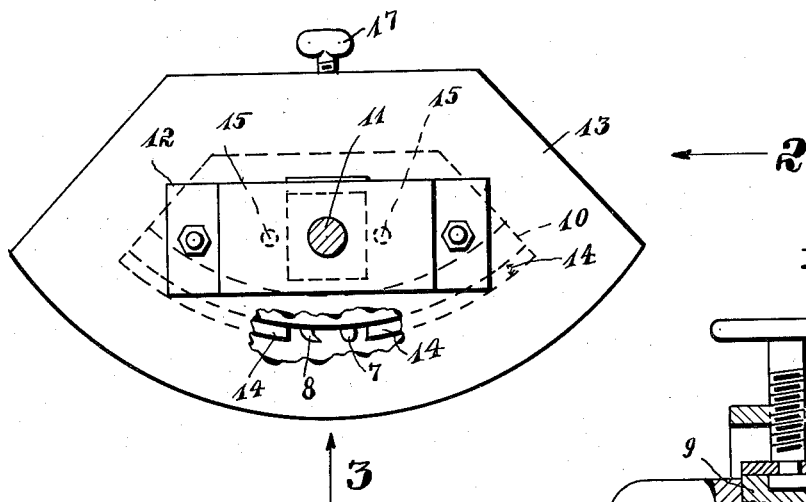
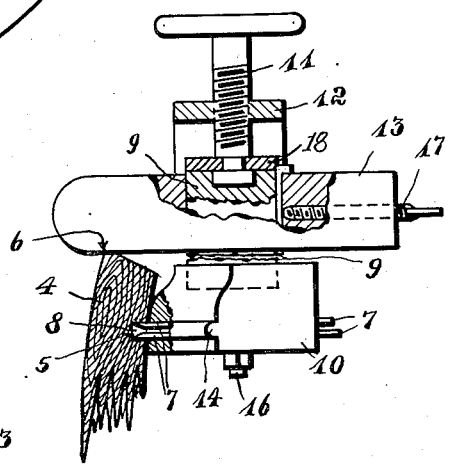
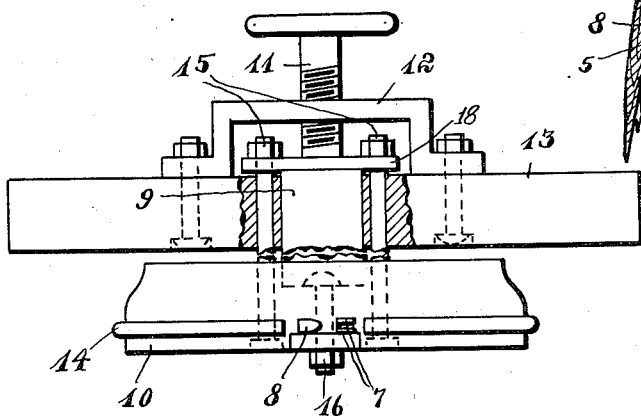
INVENTOR:
RUDOLPH APPELL,
By: Otto H. Ruger,
his Atty.

Patented July 21, 1936

2,048,315

UNITED STATES PATENT OFFICE 2,048,315

COOPER'S CROZE

Rudolph Appell, Culver City, Calif.

Application February 11, 1935, Serial No. 5,967

1 Claim. (Cl. 147—24)

This invention relates to devices used by coopers for finishing the groove in each end of a vessel such as a barrel for properly engaging the bottom snugly and tightly.

One of the objects of this invention is to provide a tool that can be adapted to any barrel quickly.

Another object is to provide a tool that can be adjusted quickly to positive positions.

Another object is to provide a tool that can be adjusted accurately to various positions.

Another object is to provide a tool that can be manipulated without any other tool for adjustments.

Other objects will appear from the following description and appended claims as well as from the accompanying drawing, in which—

Fig. 1 is a top plan view of a croze partly broken away.

Fig. 2 is a side elevation of the tool as seen in the direction of the arrow 2 in Fig. 1, partly broken away.

Fig. 3 is a side elevation of the tool as seen in the direction of the arrow 3 in Fig. 1, partly broken away.

Though crozes of this type may be used by the manufacturer of new barrels, even though a worker of a manufacturer may have to handle barrels in large numbers of very much the same size, so that an adjustment is of not such a great importance; they are particularly useful for repairmen when quickly, one after another, handling barrels that may vary considerably, having in mind that a repairer just naturally must handle barrels produced by different manufacturers, and such barrels that are made different in the first place.

For a repairer, then, it becomes very essential to have a tool that can be adjusted quickly and accurately, to properly align with the existing groove to be refinished properly, in order to produce good workmanship.

Any receptacle, such as a barrel, is commonly made up of staves of which each appears in longitudinal section at each end substantially in the form indicated at 4, provided with a groove 5, into which the bottom of a finished barrel fits when fully assembled.

The wear on the end of a barrel, however, is such that, even with barrels made by the same manufacturer, and barrels that originally were made very much alike, there will appear a difference in the distance from the end-face 6 to the groove 5 in different barrels.

In order to apply his croze in the customary manner, the repairman has to adjust the cutters of his croze to the distance from the front-face 6 to the groove 5.

Crozes commonly in use afford an adjustment only by wedging and hammering, which, of course, cannot very well be either accurate or quickly accomplished.

The principal feature of this invention involves such positive and quick adjustments, having the cutters 7 and 8 mounted on a shiftable member, composed of the shifting block 9 and the cutter-head 10, the block 9 and the head 10 being operative by the adjusting spindle 11 operatively mounted in the bracket 12 on the operating plate or handle-member 13.

In order to properly guide the cutters, the head is preferably made of a suitable shape and provided with a tongue or bead 14 to pass along the groove in the barrel, and since the head is of such a special shape, while the shifting block quite to the contrary is rather evenly thick for shifting movements in an up and down direction, the two parts are preferably made separately and then bolted together as at 15 with the head 10 over one end and a top plate 18 over the opposite end of the block 9.

For removably and exchangeably holding the cutters in the head, the clamping means 16 are arranged so that the cutters may be reached from the bottom.

A setting means 17 is provided to maintain the cutters and the head firmly in adjusted positions.

Having thus described my invention, I claim:

In a croze, a cutterhead, adjusting means for the cutterhead, a guide block associated with the cutterhead, a top plate extending beyond the upright sides of the guide block and having means for turnably engaging the end of said adjusting means, connecting bolts passing at the sides of the guide block and through the cutterhead and top plate to thereby clamp the block between the head and plate, a base with guiding passages for the guide block and for the connecting bolts, and a bracket bridging the passages and having means for turnably and adjustably holding the adjusting means for its controlling actions on the cutterhead with respect to the base.

RUDOLPH APPELL.